(12) United States Patent
Gartner et al.

(10) Patent No.: US 9,302,941 B2
(45) Date of Patent: Apr. 5, 2016

(54) SURFACTANTS

(75) Inventors: Ellis Gartner, Lyons (FR); Lê-Chiên Hoang, Ruy-montceau (FR)

(73) Assignee: LAFARGE, Paris (FR)

( * ) Notice: Subject to any disclaimer, the term of this patent is extended or adjusted under 35 U.S.C. 154(b) by 113 days.

(21) Appl. No.: 14/343,664

(22) PCT Filed: Sep. 5, 2012

(86) PCT No.: PCT/EP2012/067257
§ 371 (c)(1),
(2), (4) Date: Apr. 22, 2014

(87) PCT Pub. No.: WO2013/034567
PCT Pub. Date: Mar. 14, 2013

(65) Prior Publication Data
US 2014/0245929 A1  Sep. 4, 2014

(30) Foreign Application Priority Data

Sep. 8, 2011 (EP) .................................... 11306117

(51) Int. Cl.
| | |
|---|---|
| *C04B 38/10* | (2006.01) |
| *C04B 24/40* | (2006.01) |
| *C04B 24/00* | (2006.01) |
| *C04B 24/16* | (2006.01) |
| *C04B 24/24* | (2006.01) |
| *C04B 20/10* | (2006.01) |
| *C04B 103/40* | (2006.01) |

(52) U.S. Cl.
CPC ........... *C04B 24/405* (2013.01); *C04B 20/1022* (2013.01); *C04B 24/003* (2013.01); *C04B 24/16* (2013.01); *C04B 24/243* (2013.01); *C04B 38/10* (2013.01); *C04B 2103/40* (2013.01)

(58) Field of Classification Search
CPC .......................................................... C04B 38/10
USPC ......................................... 106/724, 727, 823
See application file for complete search history.

(56) References Cited

U.S. PATENT DOCUMENTS

2009/0325780 A1   12/2009  Gauckler et al.

FOREIGN PATENT DOCUMENTS

| WO | WO 98/25865 | 6/1998 |
| WO | WO 2005/080294 | 9/2005 |

OTHER PUBLICATIONS

International Preliminary Report on Patentability as issued for International Application No. PCT/EP2012/067257, dated Mar. 20, 2014.
Krauss Juillerat, F., et al., "Microstructural Control of Self-Setting Particle-Stabilized Ceramic Foams," J. Am. Ceram. Soc., vol. 94, No. 1, 2011, pp. 77-83.
Dong, X., et al., "Aqueous foam stabilized by hydrophobically modified silica particles and liquid paraffin droplets," Colloids and Surfaces A: Physiochem. Eng. Aspects, vol. 353, No. 2-3, 2010, pp. 181-188.
International Search Report as issued for International Application No. PCT/EP2012/067257, dated Mar. 12, 2013.

*Primary Examiner* — Paul Marcantoni
(74) *Attorney, Agent, or Firm* — Pillsbury Winthrop Shaw Pittman LLP

(57) ABSTRACT

A particulate material for the production of a cement foam which material includes particles including, attached to the particle surface, a surfactant which renders the particles hydrophilic, the surfactant including a moiety which is hydrolysable under alkaline conditions, which surfactant, after loss of the moiety by alkaline hydrolysis, renders the particles partially hydrophobic.

10 Claims, No Drawings

SURFACTANTS

CROSS-REFERENCE TO RELATED APPLICATIONS

This is the U.S. National Stage of PCT/EP2012/067257, filed Sep. 5, 2012, which in turn claims priority to European Patent Application No. 11306117.0, filed Sep. 8, 2011, the entire contents of both applications are incorporated herein by reference in their entireties.

The present invention relates to a surfactant-treated particulate material used to prepare a mineral-based foam.

A freshly prepared foam, which comprises a gas phase and a liquid phase, generally comprises gas bubbles in the liquid. The liquid phase may in fact be a suspension of solid particles in a liquid. Fresh foams are generally unstable and tend to collapse to the bubble-free liquid which has a lower energy state, as the gas escapes to the atmosphere. In, for example, an aqueous system a surfactant, which lowers the surface tension at the liquid-gas interface, is usually required in order to stabilise a freshly prepared foam.

A fresh foam can also be stabilized by solid particles, for example of silica, which can adsorb at the interface between two phases and thus act as solid surfactants. In water based foams particles which have been rendered partially hydrophobic are more effective.

A stable fresh foam can be converted into a stable solid foam of similar density and pore structure by a known curing process such as hydration or polymerisation. However, if the fresh foam is not stable, it is likely to collapse to a large extent during the curing process, leading to a solid foam of much greater density, which is undesirable for many applications.

Gauckler et al have proposed a system for stabilizing water-dispersed mineral foams, based on "Pickering" foams in which air voids are stabilized by a shell of partially hydrophobized particles.

They propose to add a suitable surface active chemical to a well-dispersed aqueous suspension of mineral powder(s) such that the chemical becomes adsorbed onto the surfaces of the mineral particles, rendering them partially hydrophobic and thus capable of stabilizing mineral foams as "Pickering surfactant" particles. They have also shown that it is possible to solidify such water-dispersed mineral foams by the incorporation of hydraulic cement particles into the mineral dispersion. However, the method proposed by Gauckler et al has the disadvantage that it results in the treatment of all of the solid particles in the suspension with a solution of the same surface-active chemical, resulting in the need for high dosages if, as is usually the case, this chemical is adsorbed to a significant extent on many of the solid surfaces present. In addition to the high cost of this "excess" dosage, this adsorption can also often lead to the problem of severe set retardation of the hydraulic cement (e.g. if the surface-active chemical adsorbs on cement compounds).

The present invention seeks to provide a means of preparing a stable cement-containing foam by using a particulate material carrying a surfactant which initially renders the particles hydrophilic but which, after alkaline hydrolysis of the surfactant, renders the articles partially hydrophobic.

The present invention provides a particulate material for the production of a cementitious foam which material comprises particles comprising, attached to the particle surface, a surfactant which renders the particles hydrophilic, the surfactant comprising a moiety which is hydrolysable under alkaline conditions, which surfactant, after loss of the moiety by alkaline hydrolysis, renders the particles partially hydrophobic.

The particulate material generally comprises inorganic, e.g. mineral, particles. The inorganic particles preferably comprise calcium carbonate, silica or alumina and include for example ground limestone, including dolomitic limestone, precipitated calcium carbonate, silica fume, slag, fly ash, quartz, clay minerals and siliceous fillers such as glass. Preferred particulate materials are those which comprise calcium carbonate, for example ground limestone or precipitated calcium carbonate.

The mean size of the particles is preferably from 0.1 to 20 μm, more preferably from 1 to 5 μm. The particles may have a broad or narrow particle size distribution.

The partially hydrophobic particulate material preferably has a contact angle with water at ambient temperature of more than 30° (preferably 60-80°).

The surfactant preferably has the general formula:

$$(A)_q B\text{-}E\text{-}D \qquad (I)$$

wherein A represents a group attached to the group B and capable of attaching to the surface of a particle; and q is from 1 to 6, preferably 1, 2 or 3;

B represents a hydrophobic group capable of rendering the particle partially hydrophobic (for example by giving it a contact angle of more than 30° (preferably 60-80°) with water);

E represents a bond susceptible to alkaline hydrolysis; and

D represents a hydrophilic group which renders the surfactant water soluble;

or a polymer, preferably a comb polymer, comprising a plurality of (preferably 2 to 400) groups of formula (I) covalently bonded to each other, preferably via the groups B.

The group A preferably represents phosphonate [(MO)$_2$P(=O)—]; phosphate [(MO)$_2$P(=O)—O—]; sulphonate [MO$_3$S—]; sulphate [MO$_3$S—O—] or a carboxylate group [MO—OC—], wherein M represents a hydrogen atom or an alkali metal atom, preferably potassium or, more preferably sodium, The group A preferably remains attached to the particle at pH values >7, more preferably >10, most preferably >12. For example phosphonate groups are known for their ability to bond strongly to calcium-rich surfaces, such as the surfaces of calcium carbonates or calcium silicates, over a wide range of pH values extending into highly alkaline systems (pH>12). For very highly alkaline systems (pH>13) phosphated and/or phosphonated gallate or phloroglucinol derivatives are also effective. In either case, the strength of the attachment can be increased by increasing the number of groups A attached to the group B.

The group B preferably represents:

a straight- or branched-chain alkyl group, for example of the general formula H—(C$_p$H$_{2p}$)— wherein p is from 2 to 20;

a (C$_1$ or C$_2$)alkylamino (C$_2$ to C$_{18}$)alkyl or di(C$_1$ or C$_2$)alkylamino(C$_2$ to C$_{18}$)alkyl group;

a methylphenyl(C$_1$ or C$_2$)alkoxy(C$_8$ to C$_{24}$)alkyl group; or a grouping of the formula:

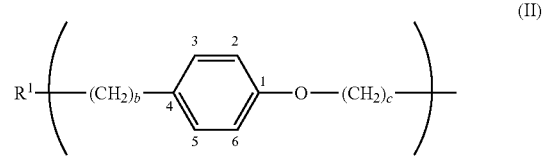

(II)

wherein b is 0 or 1, c is 8-24 and: when b is 0, $R^1$ represents a group A which is —C(=O)—OM wherein M is as hereinbefore defined; when b is 1, $R^1$ represents a phosphonate group A attached to the group —CH$_2$— of the group B;

or a grouping in which a plurality of, preferably up to 400, groupings of formula (II) are attached to each other (i) at the 2-position or at the 2- and 6-positions; or (ii) at the 3-position or at the 3- and 5-positions, by a grouping of the formula:

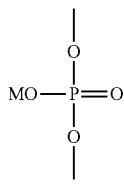
(III)

wherein M is as hereinbefore defined;
or
B represents a group of the formula:

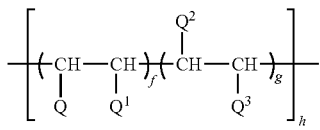
(IIa)

wherein one of Q and $Q^1$ represents hydrogen or a bond attached to a group A (preferably a carboxylate group COOM, M being as hereinbefore defined), and the other represents a bond attached to a group A (preferably a carboxylate group COOM, M being as hereinbefore defined), one of $Q^2$ and $Q^3$ represents hydrogen or alkyl (preferably straight chain) of 1 to 10 carbon atoms unsubstituted or substituted by hydroxy (preferably by a single hydroxy), and the other represents alkylene (preferably straight chain) of 1 to 10 carbon atoms which alkylene group is attached to the hydrolysable group E as hereinbefore defined, the ratio f/g is 1 to 20, and h is 1 to 200; and in which from 1 to 6, preferably 1, 2 or 3 hydrogen atoms attached to carbon in an alkyl, phenyl or phenoxy moiety of the group B is replaced by a group A;

When more than one group A is present on the group B they are generally attached to different carbon atoms.

When B represents a group of formula (II) and b is 0, phosphate groups are preferably attached to the 2- and 6-positions of the phenyl ring. When B represents a group of formula (II) and b is 1, preferably $R^1$ represents phosphonate and phosphate groups are attached to the 3- and 5-positions of the phenyl ring.

The hydrophobicity of group B is determined, inter alia, by the number of repeating methylene units (—CH$_2$—).

The group E preferably represents a carbonyloxy —C(=O)—O— or oxycarbonyl group —O—C(=O)—.

D preferably represents:

a group of the general formula —R$^2$—C(=O)—OR$^3$ wherein $R^2$ represents a single bond; a straight- or branched-chain saturated alkylene chain containing from 1 to 6 carbon atoms unsubstituted or substituted on different carbon atoms by from 1 to 4 hydroxy groups and/or by an amino group; or a straight- or branched-chain unsaturated alkenylene chain containing from 2 to 6 carbon atoms; and $R^3$ represents a hydrogen atom, straight- or branched-chain alkyl of 1 to 4 carbon atoms, preferably a methyl group, or an alkali metal atom, for example potassium or, preferably sodium;

or a grouping of the general formula:

(IV)

wherein k is 1 to 50, preferably 2 to 6, and R is hydrogen or straight- or branched-chain alkyl of 1 to 3 carbon atoms, preferably methyl;

or D represents a glycerol or polyglycerol chain of the general formula:

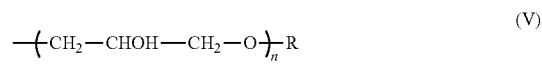
(V)

in which n is from 1 to 20 and R is as hereinbefore defined.

According to a further feature of the invention the surfactant is:

(i) a linear mono-phosphonate preferably of the general formula:

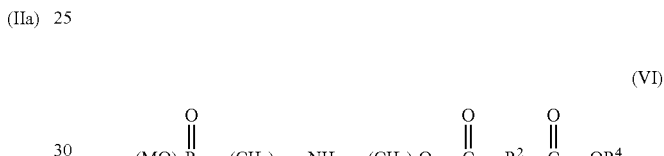
(VI)

wherein z is 1 or 2; x is 8 to 18; $R^4$ represents a hydrogen atom or straight- or branched-chain alkyl of 1 to 4 carbon atoms (preferably a methyl group) or an alkali metal atom, for example potassium or, preferably sodium, or a grouping of the general formula (IV) as hereinbefore defined; and M and $R^2$ are as hereinbefore defined;

(ii) a linear di-phosphonate preferably of the general formula:

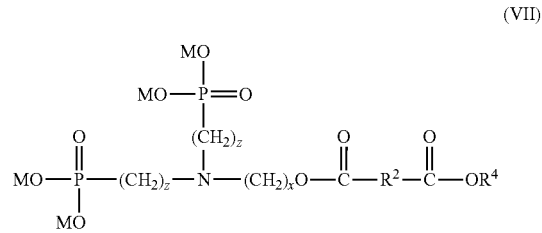
(VII)

wherein z, x, M, $R^2$ and $R^4$ are as hereinbefore defined;

(iii) an aromatic phosphonate, preferably of the general formula:

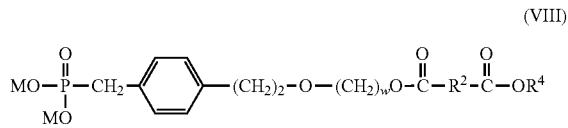
(VIII)

wherein w is 8 to 24 and M, $R^2$ and $R^4$ are as hereinbefore defined;

(iv) a gallate derivative of the general formula:

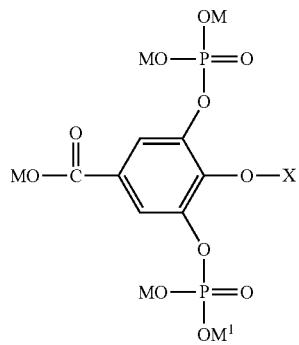

(IX)

wherein M is as hereinbefore defined, X represents a group of the formula:

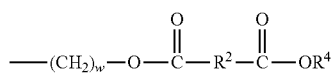

(X)

wherein w, $R^2$ and $R^4$ are as hereinbefore defined;

and $M^1$ represents a group M as hereinbefore defined, or $M^1$ represents a group of the formula:

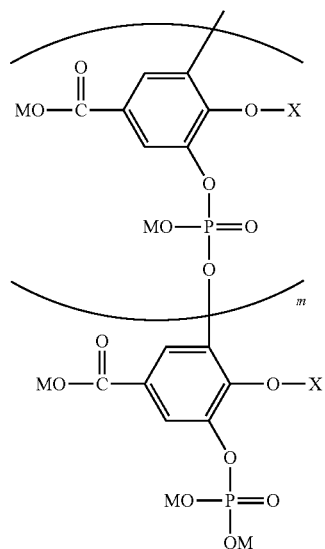

(XI)

wherein m is 0 to 400 and M and X are as hereinbefore defined;

(v) a phloroglucinol derivative of the general formula:

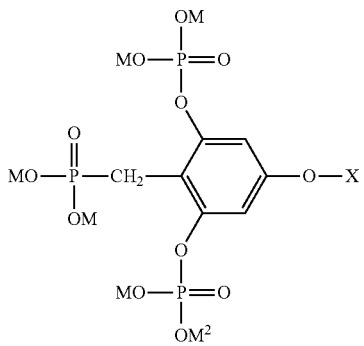

(XII)

wherein M and X are as hereinbefore defined, and $M^2$ represents a group M as hereinbefore defined, or $M^2$ represents a group of the formula:

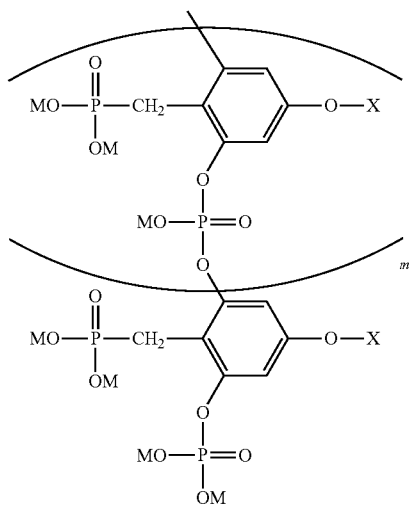

(XIII)

wherein M, X and m are as hereinbefore defined;

(vi) a sulphate, sulphonate or phosphate ethoxylated oleic acid ester surfactant preferably of the general formula:

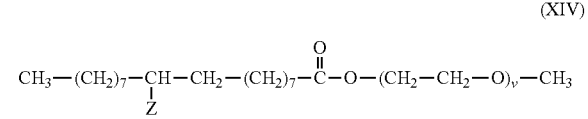

(XIV)

wherein v is 1 to 20 and Z represents sulphate, sulphonate or phosphate;

(vii) a sulphate, sulphonate or phosphate ethoxylated linoleic acid ester surfactant preferably of the general formula:

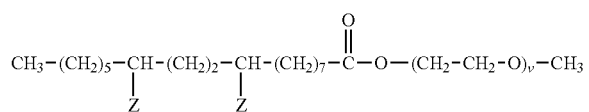
(XV)

wherein v and Z are as hereinbefore defined;

(viii) a sulphate, sulphonate or phosphate ethoxylated linolenic acid ester surfactant preferably of the general formula:

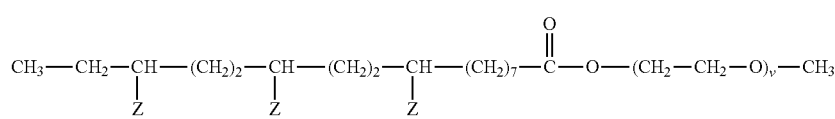
(XVI)

wherein v and Z are as hereinbefore defined; or (ix) a copolymer of acrylic or maleic acid and an ethoxylated unsaturated fatty acid ester, preferably of the general formula:

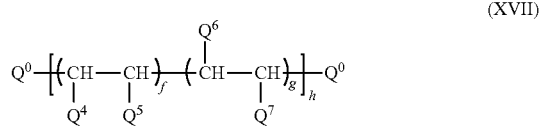
(XVII)

wherein $Q^0$ represents a moiety from the polymerization initiator or transfer agent, one of $Q^4$ and $Q^5$ represents hydrogen or a group —COOM and the other represents a group —COOM, one of $Q^6$ and Q7 represents hydrogen, a group —$(CH_2)_7$—$CH_3$ or a group —$CH_2$—$CH(OH)$—$(CH_2)_5$—$CH_3$, and the other represents a group of the formula:

(XVIII)

wherein $Q^8$ represents —$(CH_2)_7$— or —$(CH_2)_8$—, $Q^9$ represents a group of formula (IV) and M, R, k, f, g and h are as hereinbefore defined.

In formula (XVII):
(i) when one of $Q^4$ and $Q^5$ represents hydrogen and the other represents a group —COOM, one of $Q^6$ and $Q^7$ represents hydrogen and the other represents a group of formula (XVIII) in which $Q^8$ represents a group —$(CH_2)_8$—, and $Q^9$ represents a group of formula (IV) in which R represents methyl and M, f, g, h and k are as hereinbefore defined, the compound is a polymer of acrylic acid and ethoxylated undecylenic acid;

(ii) when one of $Q^4$ and $Q^5$ represents hydrogen and the other represents a group —COOM, one of $Q^6$ and $Q^7$ represents a group —$(CH_2)_7$—$CH_3$, and the other represents a group of formula (XVIII) in which $Q^8$ represents a group —$(CH_2)_7$—, and $Q^9$ represents a group of formula (IV) in which R represents methyl and M, f, g, h and k are as hereinbefore defined, the compound is a polymer of acrylic acid and ethoxylated oleic acid;

(iii) when one of $Q^4$ and $Q^5$ represents hydrogen, and the other represents a group —COOM, one of $Q^6$ and $Q^7$ represents a group —$CH_2$—$CH(OH)$—$(CH_2)_5$—$CH_3$ and the other represents a group of formula (XVIII) in which $Q^8$ represents a group —$(CH_2)_7$—, and $Q^9$ represents a group of formula (IV) in which R represents methyl and M, f, g, h and k are as hereinbefore defined, the compound is a polymer of acrylic acid and ethoxylated ricinoleic acid;

(iv) when $Q^4$ and $Q^5$ each represents a group —COOM, one of $Q^6$ and $Q^7$ represents hydrogen and the other represents a group of formula (XVIII) in which $Q^8$ represents a group —$(CH_2)_8$—, and $Q^9$ represents a group of formula (IV) in which R represents methyl and M, f, g, h and k are as hereinbefore defined, the compound is a polymer of maleic acid and ethoxylated undecylenic acid;

(v) when $Q^4$ and $Q^5$ each represents a group —COOM, one of $Q^6$ and $Q^7$ represents a group —$(CH_2)_7$—$CH_3$ and the other represents a group of formula (XVIII) in which $Q^8$ represents a group —$(CH_2)_7$—, and $Q^9$ represents a group of formula (IV) in which R represents methyl and M, f, g, h and k are as hereinbefore defined, the compound is a polymer of maleic acid and ethoxylated oleic acid;

(vi) when $Q^4$ and $Q^5$ each represents a group —COOM, one of $Q^6$ and $Q^7$ represents a group —$CH_2$—$CH(OH)$—$(CH_2)_5$—$CH_3$ and the other represents a group of formula (XVIII) in which $Q^8$ represents a group —$(CH_2)_7$—, and $Q^9$ represents a group of formula (IV) in which R represents methyl and M, f, g, h and k are as hereinbefore defined, the compound is a polymer of maleic acid and ethoxylated ricinoleic acid.

The grouping ED in the foregoing formulae is preferably a grouping of the general formula:

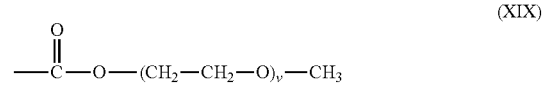
(XIX)

wherein v is as hereinbefore defined; or
a grouping of the general formula:

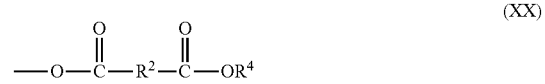
(XX)

wherein $R^2$ is derived from a dicarboxylic acid, a hydroxy dicarboxylic acid, an amino dicarboxylic acid or an ethylenically unsaturated dicarboxylic acid, for example oxalic acid, malonic acid, succinic acid, maleic acid, fumaric acid, glutaric acid, adipic acid, tartaric acid or aspartic acid and $R^4$ is as hereinbefore defined.

The surfactant, after loss of the moiety ED by alkaline hydrolysis, preferably has an HLB value of 3 to 13.

According to a feature of the invention the particulate material according to the invention is prepared by contacting particles with a surfactant which renders the particles hydrophilic, the surfactant comprising a moiety which is hydrolysable under alkaline conditions, which surfactant, after loss of the moiety by alkaline hydrolysis, renders the particles partially hydrophobic, the surfactant being as hereinbefore defined.

The particulate material may, for example, be contacted with an aqueous solution of the surfactant.

The invention also provides a cementitious composition comprising a particulate material according to the invention and a cement. The cementitious composition preferably further comprises liquid water: the composition is generally in the form of a slurry. The invention provides a method of preparing a cementitious composition which method comprises contacting cement and a particulate material according to the invention.

The invention also provides a cementitious foam which comprises a particulate material according to the invention, a cement, liquid water and a gas, generally air: the invention also provides a method of preparing a cementitious foam, which method comprises foaming a composition comprising a particulate material according to the invention, a cement, liquid water and a gas. The composition to be foamed generally comprises at least about 1%, preferably at least about 2%, more preferably at least about 3% and most preferably at least about 5% of the particulate material according to the invention. The maximum concentration of the particulate material is governed by the viscosity which, it will be understood, should not be so great as to prevent successful foaming.

The invention also provides a solid cementitious foam which method comprises allowing a cementitious foam, which foam comprises a particulate material according to the invention, a cement, liquid water and a gas, to set.

According to a feature of the invention an aqueous suspension of the the particulate material according to the invention is contacted with a cement to produce a slurry and the slurry is then foamed. The slurry generally comprises a known dispersant, for example a superplasticizer.

For example, an aqueous suspension of the particulate material treated according to the invention is mixed with cement, a superplasticizer and, optionally water.

The cement releases alkaline materials into solution. As the pH increases the molecule "$A_q$BED" which remains attached to the treated particles via the group A begins to hydrolyze at group E, leaving the surface of the treated particles covered with "AB" molecules. This in turn renders the treated particles more and more hydrophobic (as the degree of hydrolysis increases) and causes them to act as air-entraining "Pickering surfactants."

Cements suitable for use in the present invention include cements which generate alkalinity when contacted with water or alkali-activated cements: the former include Portland cement, calcium aluminate cement, calcium sulfo-aluminate cement, and mixtures thereof the latter include cements based on the reaction between a strongly alkaline solution, for example of sodium hydroxide, and a reactive aluminosilicate powder, for example fly ash or metakaolin. Geopolymers based on the reaction of a strongly alkaline solution, for example of sodium hydroxide, and a pozzolan can also be used as the cement in the present invention. The alkalinity can be increased by adding an alkaline metal compound, for example an alkali metal hydroxide.

The preferred Portland cements are those defined in the EN 197-1 Standard, more preferably cements comprising calcium carbonate, silica fume, slag, fly ash, pozzolan, glass or siliceous filler or mixtures thereof. Such cements include Portland cement (CEM I); Portland slag cement; Portland-silica fume cement; Portland-pozzolana cement; Portland-fly ash cement; Portland-limestone cement; and Portland-composite cement preferably comprising calcium carbonate, silica fume, slag, fly ash, pozzolan, glass or siliceous filler or mixtures thereof pozzolanic cement; and composite cement. It will be understood that the mineral particles present in the foamed concrete of the invention may already be present in the cement if a blended cement is used.

The preferred calcium aluminate cements are, for example, the Ciments Fondus®, the aluminate cements, and cements according to the NF EN 14647 Standard.

The water/solids (W/S) ratio (in which the solids comprise ground clinker and, optionally other particulate materials) in the foamed concrete of the invention is preferably from 0.3 to 0.9, more preferably 0.4 to 0.7, most preferably about 0.45.

The amount of water reducing agent, plasticizer or superplasticizer is preferably 0.01 to 0.2%, more preferably 0.02 to 0.08%.

The water/solids weight ratio of the foamed concrete according to the invention may vary depending, inter alia, on the water demand of the inorganic particles used. In the Concrete Admixtures Handbook, Properties Science and Technology, V. S. Ramachandran, Noyes Publications, 1984: A water reducer is defined as an additive which reduces the amount of mixing water of concrete for a given workability by typically 10-15%. Water reducers include, for example lignosulphonates, hydroxycarboxylic acids, carbohydrates, and other specialized organic compounds, for example glycerol, polyvinyl alcohol, sodium alumino-methyl-siliconate, sulfanilic acid and casein.

Superplasticizers belong to a new class of water reducers chemically different from the normal water reducers and capable of reducing water contents by about 30%. The superplasticizers have been broadly classified into four groups: sulphonated naphthalene formaldehyde condensate (SNF) (generally a sodium salt); or sulphonated melamine formaldehyde condensate (SMF); modified lignosulfonates (MLS); and others. More recent superplasticizers include polycarboxylic compounds such as polyacrylates. The superplasticizer is preferably a new generation superplasticizer, for example a copolymer containing polyethylene glycol as graft chain and carboxylic functions in the main chain such as a polycarboxylic ether. Sodium polycarboxylate-polysulphonates and sodium polyacrylates may also be used.

The period of time before setting of the cementitious foams of the invention is preferably from 1 to 7 hours, for example about 2 hours.

According to a feature of the invention foaming may be effected by stirring, generally at a high shear rate to introduce the gas directly and to produce a foam.

According to a feature of the invention foaming may be effected by introducing the gas under pressure. The pressure is preferably from 1 to 5 bars gauge. The gas is preferably introduced after initial mixing at a low shear rate and before or during mixing at a high shear rate.

The gas may be introduced directly, for example, before or during mixing at a high shear rate. In particular the process of direct injection of air described in patent application WO2005/080294 may be used.

The density of the foamed concrete according to the invention may be adjusted by, for example, adjusting the amount of air introduced at the foaming step and/or adjusting the speed of the mixer used to produce the foam.

According to a feature of the invention gas may also be introduced by incorporating a material, for example aluminium powder, capable of generating gas under alkaline conditions.

The surfactants of general formula I and processes for their preparation constitute features of the present invention: they are prepared by the application or adaptation of known methods.

In this specification, including the accompanying claims, unless otherwise specified:

Percentages are by mass.

Particle size and size distribution (between 0.02 µm and 2 mm) are as measured using a Malvern MS2000 laser granulometer. Measurement is effected in ethanol. The light source consists of a red He—Ne laser (632 nm) and a blue diode (466 nm). The optical model is that of Mie and the calculation matrix is of the polydisperse type.

The apparatus is checked before each working session by means of a standard sample (Sibelco France (formerly known as Sifraco) C10 silica) for which the particle size distribution is known. Measurements are performed with the following parameters: pump speed 2300 rpm and stirrer speed 800 rpm. The sample is introduced in order to establish an obscuration between 10 and 20%. Measurement is effected after stabilisation of the obscuration. Ultrasound at 80% is first applied for 1 minute to ensure the de-agglomeration of the sample. After about 30 s (for possible air bubbles to clear), a measurement is carried out for 15 s (15000 analysed images). Without emptying the cell, measurement is repeated at least twice to verify the stability of the result and elimination of possible bubbles.

All values given in the description and the specified ranges correspond to average values obtained with ultrasound.

Contact angles with water can be measured by known methods, for example by the measurement of average contact angle for powders.

The following non-limiting Example illustrates the invention.

EXAMPLE

Fine calcium carbonate (ground limestone) particles, having a median size from 1 to 5 micrometers. are added to a stirred aqueous solution of a compound of formula (I). A superplasticizer is added to the aqueous suspension of treated particles thus obtained and cement powder is then added to the stirred mixture. The slurry thus obtained is stirred at a low shear rate to allow time for the hydrolysis of the moiety ED from the particles. The slurry is then stirred at a high shear rate to entrain air and form a cementitious foam containing liquid water. The foam containing liquid water is poured into a mould and allowed to set to a solid cementitious foam.

The invention claimed is:

1. A particulate material for the production of a cement foam which material comprises particles comprising, attached to the particle surface, a surfactant which renders the particles hydrophilic, the surfactant comprising a moiety which is hydrolysable under alkaline conditions, which surfactant, after loss of the moiety by alkaline hydrolysis, renders the particles partially hydrophobic, wherein the surfactant is of the general formula:

$$(A)_q B-E-D \qquad (I)$$

wherein A represents a group attached to the group B and capable of attaching to the surface of a particle; and q is from 1 to 6;

B represents a hydrophobic group capable of rendering the particle partially hydrophobic;

E represents a group susceptible to alkaline hydrolysis; and

D represents a hydrophilic group which renders the surfactant water soluble.

2. A particulate material according to claim 1, wherein the surfactant is of the general formula (I) wherein:

the group A represents phosphonate [$(MO)_2P(=O)$—]; phosphate [$(MO)_2P(=O)$—O—]; sulphonate [$MO_3S$—]; sulphate [$MO_3S$—O-] or a carboxylate group [MO—OC—], wherein M represents a hydrogen atom or an alkali metal atom;

the group B represents:

a straight- or branched-chain alkyl group of the general formula H—$(C_pH_{2p})$— wherein p is from 2 to 20;

a ($C_1$ or $C_2$)alkylamino ($C_2$ to $C_{18}$)alkyl or di($C_1$ or $C_2$)alkylamino($C_2$ to $C_{18}$)alkyl group;

a methylphenyl($C_1$ or $C_2$)alkoxy($C_8$ to $C_{24}$)alkyl group; or a grouping of the formula:

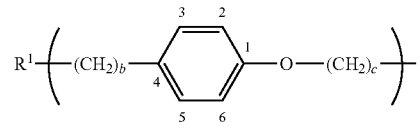

(II)

wherein b is 0 or 1, c is 8-24 and: when b is 0, $R^1$ represents a group A which is —C(=O)—OM wherein M is as hereinbefore defined; when b is 1, $R^1$ represents a phosphonate group A attached to the group —$CH_2$— of the group B;

or a grouping in which up to 400 groupings of formula (II) are attached to each other (i) at the 2-position or at the 2- and 6-positions; or (ii) at the 3-position or at the 3- and 5-positions, by a grouping of the formula:

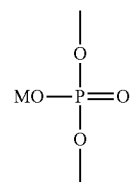

(III)

wherein M is as hereinbefore defined; or

B represents a group of the formula:

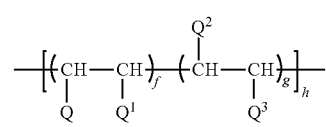

(IIa)

wherein one of Q and $Q^1$ represents hydrogen or a bond attached to a group A which is a carboxylate group —COOM, M being as hereinbefore defined, and the other represents a bond attached to a group A which is a carboxylate group —COOM, M being as hereinbefore defined, one of $Q^2$ and $Q^3$ represents hydrogen or alkyl of 1 to 10 carbon atoms unsubstituted or substituted by hydroxy and the other represents alkylene of 1 to 10 carbon atoms which alkylene group is attached to the hydrolysable group E as hereinbefore defined, the ratio f/g is 1 to 20, and h is 1 to 200; and in which 1, 2 or 3 hydrogen atoms attached to carbon in an alkyl, phenyl or phenoxy moiety of the group B is replaced by a group A;

the group E represents a carbonyloxy —C(=O)—O— or oxycarbonyl group —O—C(=O)—; and the group D represents:

a group of the general formula —$R^2$—C(=O)—$OR^3$ wherein $R^2$ represents a single bond; a straight- or branched-chain saturated alkylene chain containing from 1 to 6 carbon atoms unsubstituted or substituted on different carbon atoms by from 1 to 4 hydroxy groups and/or by an amino group; or a straight- or branched-chain unsaturated alkenylene chain containing from 2 to 6 carbon atoms; and $R^3$ represents a hydrogen atom, straight- or branched-chain alkyl of 1 to 4 carbon atoms, or an alkali metal atom;

or a grouping of the general formula:

  (IV)

wherein k is 1 to 50, and R is hydrogen or straight- or branched-chain alkyl of 1 to 3 carbon atoms;

or D represents a glycerol or polyglycerol chain of the general formula:

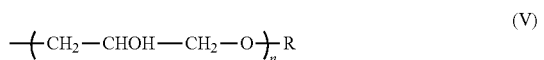  (V)

in which n is from 1 to 20 and R is as hereinbefore defined.

3. A method of preparing a particulate material for the production of a cement foam which material comprises particles, the method comprising contacting the particles with a surfactant as defined in claim 1.

4. A cementitious composition which comprises a cement and a particulate material for the production of a cement foam which particulate material comprises particles comprising, attached to the particle surface, a surfactant which renders the particles hydrophilic, the surfactant comprising a moiety which is hydrolysable under alkaline conditions, which surfactant, after loss of the moiety by alkaline hydrolysis, renders the particles partially hydrophobic.

5. A cementitious composition according to claim 4 which comprises liquid water.

6. A method of preparing a cementitious composition according to claim 4 which comprises contacting the particulate material and the cement.

7. A cementitious foam which comprises a cement, liquid water, a gas and a particulate material for the production of the cementitious foam which particulate material comprises particles comprising, attached to the particle surface, a surfactant which renders the particles hydrophilic, the surfactant comprising a moiety which is hydrolysable under alkaline conditions, which surfactant, after loss of the moiety by alkaline hydrolysis, renders the particles partially hydrophobic.

8. A method of preparing a cementitious foam which comprises foaming a cementitious composition according to claim 5.

9. A solid cementitious foam obtainable by allowing a cementitious foam according to claim 7 to set.

10. A water soluble surfactant as defined in claim 1.

* * * * *